I. BALSEIRO.
CANE HARVESTER.
APPLICATION FILED APR. 14, 1917.
1,237,859.
Patented Aug. 21, 1917.
4 SHEETS—SHEET 1.
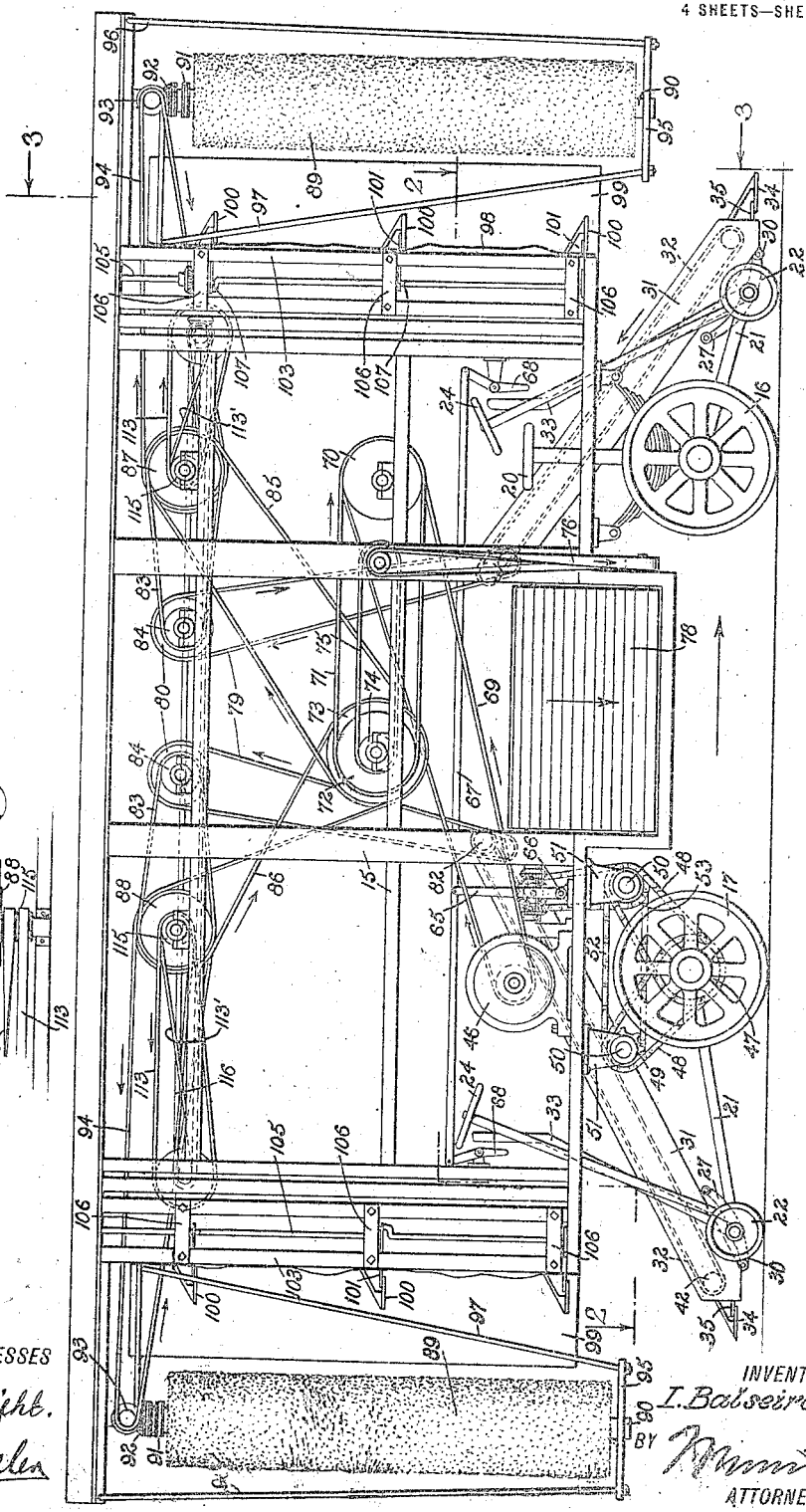
WITNESSES
INVENTOR
I. Balseiro
BY
ATTORNEYS

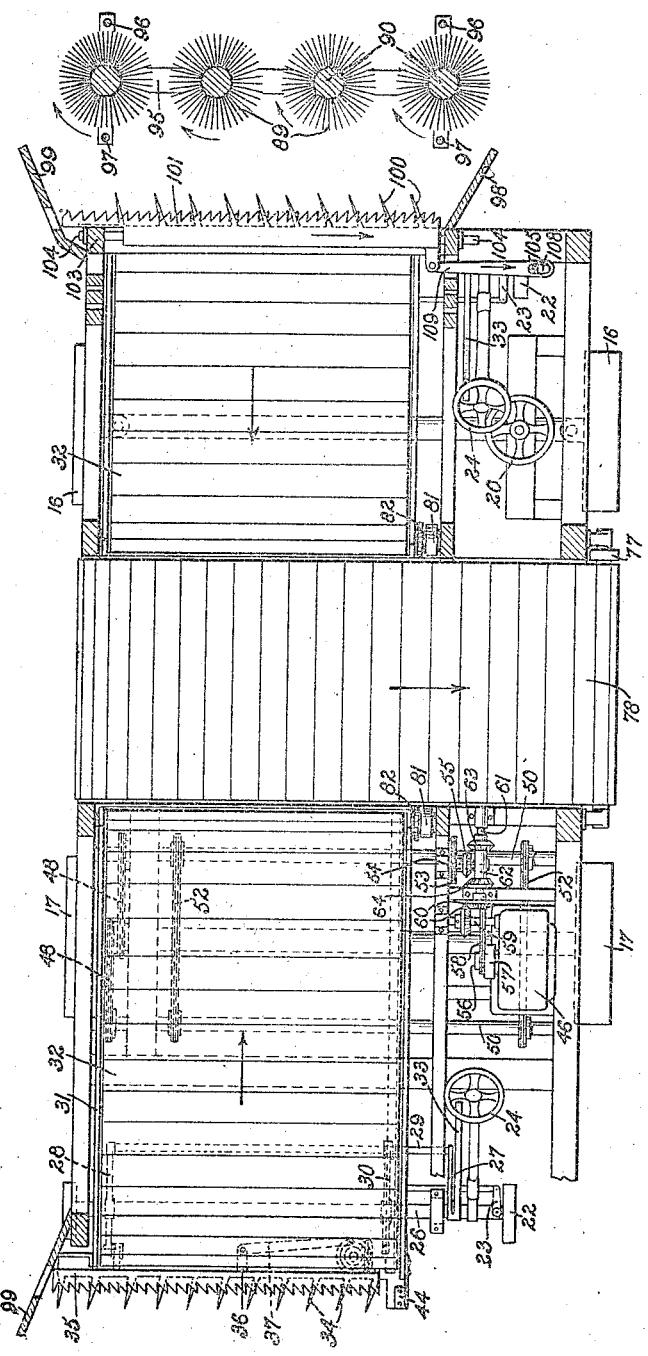

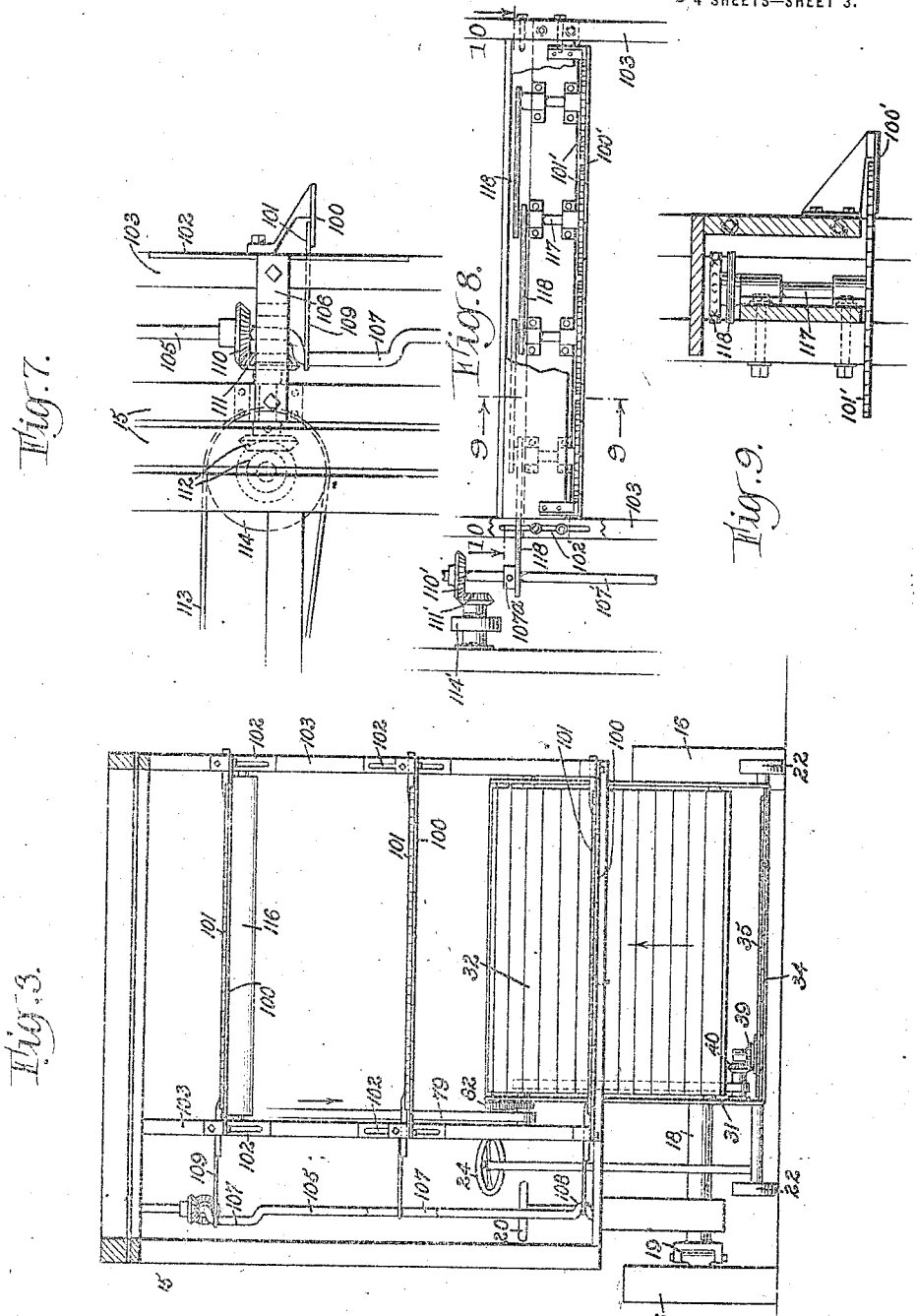

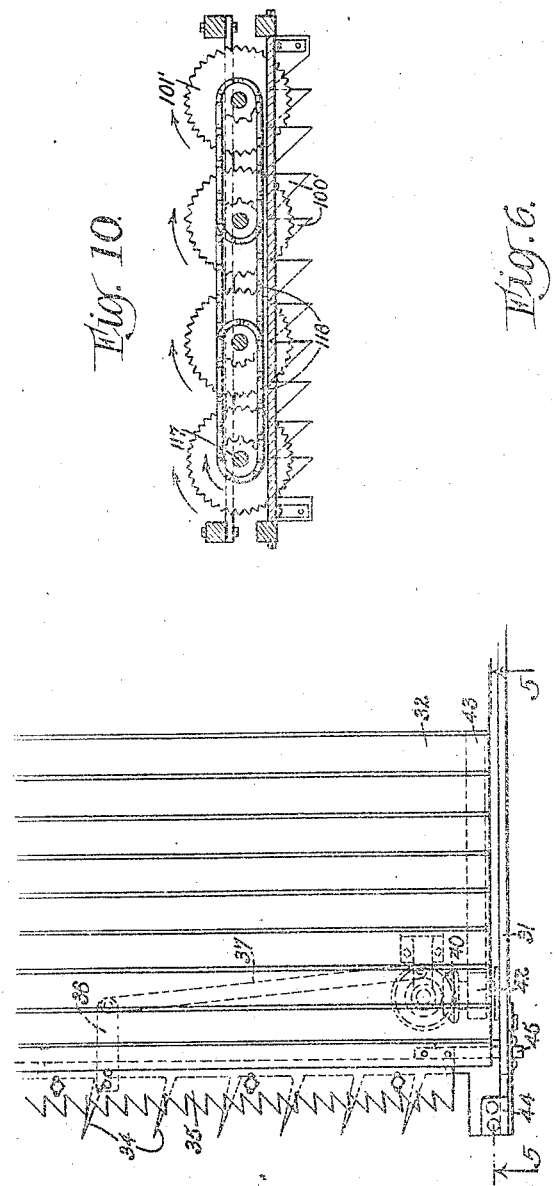

UNITED STATES PATENT OFFICE.

ISAAC BALSEIRO, OF NEW YORK, N. Y.

CANE-HARVESTER.

1,237,859.

Specification of Letters Patent.   Patented Aug. 21, 1917.

Application filed April 14, 1917.   Serial No. 162,026.

*To all whom it may concern:*

Be it known that I, ISAAC BALSEIRO, a subject of the King of Spain, and resident of the city of New York, borough of Manhattan, in the county and State of New York, have invented a new and Improved Cane-Harvester, of which the following is a full, clear, and exact description.

This invention relates to harvesting machinery and has particular reference to self propelled machines designed especially for stripping and delivering the cane in short lengths into the carts or cars.

Among the objects of the invention is to improve machines of this type with respect to the gathering of the stalks of cane and treating the same preliminary to the delivery into the cars.

Another object of the invention is to improve the facilities for guiding the machine and for manipulating the cutting devices operating adjacent to the ground.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation.

Fig. 1ª is a plan view of a detail of a part of the machine shown just below it in Fig. 1.

Fig. 2 is a horizontal section on the line 2—2 of Fig. 1.

Fig. 3 is a vertical transverse section on the line 3—3 of Fig. 1.

Fig. 4 is an enlarged plan view of a portion of the machine at the left end of Fig. 2.

Fig. 5 is a vertical sectional detail on the line 5—5 of Fig. 4.

Fig. 6 is a front elevation of a portion of the device as seen from the left end of Fig. 2.

Fig. 7 is an enlarged detail view corresponding to a part at the upper right hand corner of Fig. 1.

Fig. 8 is a front elevation partly in section indicating a modified form of cutting device.

Fig. 9 is a vertical sectional detail on the line 9—9 of Fig. 8; and

Fig. 10 is a horizontal section of the same on the line 10—10 of Fig. 8.

Referring now more particularly to the drawings I show an automobile or self operating machine comprising a main body or frame 15 supported upon two main trucks comprising what may be termed for convenience of description as front and rear wheels 16 and 17 respectively. The wheels 16 are connected to their shaft 18 by means of steering knuckles 19 through which the machine is adapted to be steered through a hand wheel 20 or its equivalent when the machine is to be transporated on the road or when making short turns. It is to be understood, however, that for ordinary operation along the field the machine is adapted to be driven and guided from either end or without turning at the end of one swath so that during such ordinary operation the steering device 20 is inoperative or serves to hold the front wheels stationary with respect to the machine as a whole.

Adjacent to each truck and extending outwardly therefrom longitudinally of the machine is what may be termed a pony truck comprising a frame 21, wheels 22, steering knuckles 23 and a hand wheel 24. These devices as shown in Figs. 1 and 2 are duplicated at the opposite ends of the machine so that an operator at either end may guide the machine during its practical operation at which time either end may be regarded as the front. The knuckles 23 of each pony truck are connected to the shaft 26 upon each of which are mounted a pair of levers 27 and 28 connected by a crossbar 29. The crossbar serves as a connector for a third lever 30 similar in its nature to the lever 28. The crossbar is connected to the inner ends of the levers 28 and 30 and their front ends bear upwardly against the bottom of a carrier frame 31 in which is arranged an inclined elevator belt 32. A hand lever 33 of any suitable nature is connected to each of the levers 27 whereby the system of levers just referred to may be manipulated or rocked around the axis of the shaft 26 for the purpose of tilting the lower end of the frame 31 more or less up or down to accommodate such lower end to variable conditions of the ground over which the machine is being transported while in practical operation. Sometimes the ground is rough or uneven but more frequently it is wet and swampy in spots requiring the elevation of the lower end of the frame accordingly to prevent the cutting devices adjacent thereto from becoming submerged. This lever 33 is under the direct control of the operator adjacent to the hand wheel 24. The cutting devices just referred to as mounted upon the lower end of the frame 31 comprise a stationary series of guards 34 arranged parallel to one another but held at an angle to the longitudinal axis of the machine, the inclination of the points of the guards being directed toward the uncut portion of the field. Coöperating with these guards 34 is a reciprocating cutter 35 comprising a series of teeth directed preferably in the opposite direction from the inclination of the guards 34. The cutter bar 35 is provided with a shank 36 having a pitman 37 connecting it to a crank wheel 38 to which is connected a bevel gear 39 meshing with another gear 40 mounted upon a short horizontal shaft 41 and to which is connected a belt pulley 42. The driving belt 43 or its equivalent operates parallel to and below the carrier belt 32 to drive the cutting devices just described. The stationary guards 34 are braced at 44 to the main frame 31. The cutter bar 35 is extended at least at one end as shown at 45 through the side of the frame 31. These cutting devices are designed to operate at the proper elevation above the surface of the ground for the lowermost cut, such elevation being regulatable through manipulation of the lever 33.

Any suitable means may be provided to propel the machine and operate the various power operated devices carried thereby. For this purpose I indicate a motor or engine at 46 of any desired type mounted upon the lower portion of the main frame 15 and preferably directly over one of the main trucks. The wheels 17 are tractor wheels and have secured thereto chain wheels 47 over which power chains 48 operate over sprocket wheels 49 mounted upon parallel counter shafts 50 supported in bearings 51 suspended from the frame. These two counter shafts are connected by chains 52 whereby they are caused to operate in unison from the main drive chain 53 from a sprocket wheel mounted upon a short horizontal transverse shaft 54 having at its outer end a beveled pinion 55.

The main engine shaft 56 has connected to it a belt pulley 57 and also a chain wheel for a drive chain 58. This chain operates a shaft 59 having beveled gear connections 60 with a shaft 61 on which is mounted a sleeve 62 bearing a pair of spaced beveled wheels 63 and 64 adapted to mesh in alternation with the beveled pinion 55. This sleeve 62 is shiftable endwise along its shaft 61 for the purpose of changing the direction of the movement of the machine by means of a lever 65 fulcrumed at one end at 66 and connected at its other end to a shifting bar 67 to each end of which is attached a hand lever 68 in convenient reach of the operator at the other end of the machine.

From the belt pulley 57 is operated a driving belt 69 operating over a double pulley 70 from which another belt 71 leads to the pulley 72 which is one of the group of pulleys including a larger pulley 73 and a smaller pulley 74. From this smallest pulley the belt 75 operates to drive a belt 76 over a pulley 77 to operate the side delivery carrier belt 78 downwardly inclined and adapted to deliver the material from the middle of the machine laterally to a cart or car which may be propelled or driven in any suitable manner along the main machine while the latter is in operation. The elevator belts 32 convey the cut or short lengths of the cane upwardly and inwardly toward and over the laterally directed belt 78 from either end of the machine. The direction of movement of these parts is indicated by the arrows on Fig. 2. The belts 32 are driven from a pair of belts 79 connecting the overhead pulleys 80 to pulleys 81 adjacent to the upper ends of the elevator frames 31 where a pair of gears 82 for each carrier belt drive such belt. The pulleys 80 are driven by a pair of belts 83 operating over pulleys 84 coaxial with the pulleys 80 and driven in turn from straight and crossed belts 85 and 86 from the pulleys 73. These belts 85 and 86 operate over double pulleys 87 and 88 respectively.

As will be understood from Fig. 2 the main power devices or means for driving the operating parts are located mainly on one side of the machine, namely the delivery side, making it expedient for the other side to operate close to or within the standing cane while the machine is driven across the field. I provide therefore for each end of the machine a plurality of stripping devices in the nature of cylindrical rollers or brushes 89. These brushes in each group are rotated around parallel vertical shafts 90 all in the same direction so that the ends or points of the bristles or wires constituting one brush will operate in an opposite direction from the adjacent bristles or wires of the next adjacent brush, the distance between the adjacent brushes being determined according to the size of the stalks of cane or the stiffness of the bristles or wires. Since the adjacent bristles operate in opposite directions at the same speed there is no tendency of the brushes to either retard or accelerate the relative movement of the canes toward the machine prior to the cutting of the canes but while the canes are passing relatively through or between the brushes the leaves thereof are swept or stripped and dropped to the ground. The canes therefore in perfectly stripped conditions are delivered to the several sets of cutting devices arranged in parallel horizontal planes one above another. The shafts 90 are provided with pairs of gears over which sprocket chains 91 operate from one shaft to another, the first shaft of the series being provided with a bevel gear 92 driven by another bevel gear 93 from a belt 94, the belts 94 for the different ends of the machine being driven from the double pulleys 87 and 88 respectively. The brushes 89 are supported upon an auxiliary frame 95 suspended by rods 96 and 97 or their equivalent from the upper part of the main frame 15. To avoid confusion the lowermost cutting device at the right end of the machine is omitted from Fig. 2 and a portion of the gathering means is broken away in Fig. 1 to disclose the cutting devices to the best advantage. The gathering means just referred to includes for each end of the machine a pair of flaring guides 98 and 99.

Mounted upon each end of the main frame 15 are a series of cutting devices operating in parallel horizontal planes. These cutting devices are auxiliary to those shown at 34 and 35 and indicated as three in number. Each of these auxiliary devices includes a stationary series of guards 100 and a reciprocating toothed cutter 101. The upper two of the cutting devices are adjustable by means of slotted plates 102 connected to the upright rails 103 at either end of the machine. The lowermost auxiliary cutting device is not adjustable vertically. Each reciprocating cutter bar is provided with end extensions 104 which operate through the rails 103 to keep the cutter bar in proper operating position. Any suitable means may be provided to reciprocate these cutter bars, but for this purpose I provide a crank shaft 105 journaled in upright bearings 106. This shaft is provided with a series of three cranks 107 and 108 the latter being short while the cranks 107 are longer parallel to the axis of the shaft to accommodate the vertical adjustment of the upper two actuating devices. Each crank is provided with a connecting rod 109 leading to its corresponding reciprocating cutter bar 101. The crank shaft is provided with a bevel gear 110 meshing with a similar gear 111 connected to a short horizontal shaft driven through beveled gears 112 from a belt 113 and pulley 114 driven from a pulley 115 arranged coaxial with the pulley 87 or 88. It will now be seen that by virtue of the four independent cutting devices at either end of the machine the stalks of cane acted upon thereby are cut into three approximately equal lengths all of said pieces dropping upon the elevator belt 32 and conveyed thereby upwardly upon the side delivery carrier 78. The small ends cut off by the uppermost cutting device drop backwardly upon a long conveyer belt 116 whereby they are carried rearwardly and dropped over the rear end of the machine. This belt is adapted to operate in either direction by any suitable means and supported between the end rollers thereof by any convenient transverse supports.

By reference now to Figs. 8, 9 and 10 it will be noted that other types of cutter bars than those already described including reciprocating cutter bars may be employed, for example instead of the reciprocating cutter bars 101 operated by pitman connections from a crank shaft, I may use rotary cutters 101' each mounted upon a short vertical shaft 117 having at its upper end one or two sprocket wheels through which each rotary cutter is adapted to be driven from the next by means of a sprocket chain 118. The first of these chains is driven from a vertical power shaft 107' which may be driven through beveled gears 110' and 111' from a belt pulley 114' or by the mechanism similar to that shown in Fig. 7 for driving the crank shaft 107. These rotary cutters coöperate with any suitable stationary guard devices 100' which are adjustable vertically along the slotted plates 102'. As shown in Figs. 8 and 9 I prefer to adjust the entire cutting device vertically including the short shafts 117 and the connected gearing. The driving sprocket wheel 107ª is mounted adjustably upon the vertical power shaft 107' to accommodate the vertical adjustment of the cutting device.

As indicated in Fig. 1ª the mechanism at either end of the machine, having reference now especially to the stripping and cutting devices, is adapted to be thrown out of gear by shifting the pulley around which the driving belt 85 or 86 operates, said pulley being adapted to be clutched to the gang or series of pulleys 88 and 115. In other words while the machine is operating in one direction and the mechanism at the then front end thereof is operating, the mechanism at the opposite or rear end will be out of gear and idle. The conveyer belt 116 is adapted to be operated from one part of the double pulley 115 by means of a crossed belt 113' so as to always deliver the tailings at the rear end of the machine when the machine is operated in either direction.

I claim:

1. In a cane harvester, the combination of a main frame, two pairs of main truck wheels supporting the frame for transportation, means to steer the main truck devices in the making of short turns, a pony truck arranged beneath each end of the main frame just beyond the adjacent main truck, auxiliary steering devices coöperating with each pony truck whereby the machine is steered in cutting operation, and a plurality of cutting devices associated with and above each pony truck serving to cut the canes into short lengths, substantially as set forth.

2. In a cane harvester, the combination of a main frame, supporting and steering means for the main frame, a pony truck in front of the main supports, said pony truck comprising a frame pivoted for oscillation around a horizontal axis, a pair of wheels and steering means auxiliary to the main steering means aforesaid, horizontal cutting devices adjustably mounted upon the pony truck, means to control the elevation of these cutting devices while the machine is in operation, auxiliary cutting devices arranged in parallel planes above the pony truck cutting devices, and power means to actuate all of the cutting devices simultaneously coincidentally with the operation of the machine across the field.

3. In a cane harvester, the combination with a main frame and means to propel the same of cutting devices mounted upon the frame, means to actuate the cutting devices, stripping devices to remove the leaves from the canes prior to the cutting of the same, said stripping devices comprising a plurality of parallel vertical brushes, and means to rotate said brushes simultaneously in the same direction and at the same speed coincidentally with the operation of the cutting devices and the propelling of the main frame.

ISAAC BALSEIRO.